(12) United States Patent
Lee

(10) Patent No.: US 11,324,208 B1
(45) Date of Patent: May 10, 2022

(54) PORTABLE COMBINED FISHING ROD HOLDER AND STORAGE STAND

(71) Applicant: San Fu Lee, Tampa, FL (US)

(72) Inventor: San Fu Lee, Tampa, FL (US)

(*) Notice: Subject to any disclaimer, the term of this patent is extended or adjusted under 35 U.S.C. 154(b) by 118 days.

(21) Appl. No.: 15/929,787

(22) Filed: May 21, 2020

(51) Int. Cl.
*A01K 97/10* (2006.01)

(52) U.S. Cl.
CPC .................................. *A01K 97/10* (2013.01)

(58) Field of Classification Search
CPC ........ A01K 97/00; A01K 97/08; A01K 97/10; A47B 81/005; A47F 7/0021; A47F 7/0028
See application file for complete search history.

(56) References Cited

U.S. PATENT DOCUMENTS

| | | | | |
|---|---|---|---|---|
| 3,484,359 A * | 12/1969 | Brown | ................... | G01N 31/16 204/400 |
| 4,240,221 A * | 12/1980 | Komarnicki | ........... | A01K 97/10 43/17 |
| 4,637,157 A * | 1/1987 | Collins | .................. | A01K 87/06 43/22 |
| 4,845,881 A * | 7/1989 | Ward | ..................... | A01K 97/22 43/21.2 |
| 4,948,083 A * | 8/1990 | McNaney, Jr. | ........ | A01K 91/08 248/289.11 |
| 5,551,184 A * | 9/1996 | Grosse | .................. | A01K 87/00 43/21.2 |
| 5,697,190 A * | 12/1997 | Scribner | ............. | E04H 12/2223 248/530 |
| 5,715,952 A * | 2/1998 | Chichetti | ............... | A01K 97/10 211/70.8 |
| 5,782,453 A * | 7/1998 | Tuzza | .................... | A47G 33/12 248/519 |
| 6,176,034 B1 * | 1/2001 | Collins | .................. | A01K 87/06 43/20 |
| 6,446,930 B1 * | 9/2002 | Li | ....................... | E04H 12/2238 135/15.1 |
| 6,457,593 B1 * | 10/2002 | Hsu | .......................... | A47F 5/02 211/163 |
| 6,755,311 B2 * | 6/2004 | Berry | ...................... | B25H 3/04 211/65 |
| 6,883,268 B2 * | 4/2005 | Fraser | .................... | A01K 97/22 206/315.11 |

(Continued)

*Primary Examiner* — Timothy D Collins
*Assistant Examiner* — Nicholas Leo Seneczko
(74) *Attorney, Agent, or Firm* — Smith & Hopen, P.A.; Paul Murty

(57) ABSTRACT

A combined portable fishing rod holder and storage stand includes a base and a plurality of holder units. The base includes anchoring apertures defined therein that are configured to receive anchoring mechanisms therethrough, such as stakes, pins, and other earth anchors that can secure within a ground surface. As such, the base of the combined apparatus is securable to a ground surface. In addition, the base includes a plurality of holder receipts that receive and retain the holder units. Each holder unit is designed to receive and retain an object, such as an assembled or disassembled fishing rod, therein. In addition, the holder units are designed to be secured to each other via cable ties. As such, one or more fishing rods can be secured within the combined holder and stand during storage, transportation, and use during fishing activities, without the need to use different products for each application.

18 Claims, 7 Drawing Sheets

(56) References Cited

U.S. PATENT DOCUMENTS

| | | | | |
|---|---|---|---|---|
| 6,938,766 B1* | 9/2005 | Lee | ............................ | A47F 5/02 |
| | | | | 206/388 |
| 7,156,242 B2* | 1/2007 | Lin | ......................... | B25H 3/04 |
| | | | | 211/70.6 |
| 7,594,353 B2* | 9/2009 | Lucky | .................... | A01K 97/08 |
| | | | | 211/70.8 |
| 7,676,983 B2* | 3/2010 | Jenkins | ................. | A01K 97/06 |
| | | | | 43/21.2 |
| 8,636,259 B2* | 1/2014 | Manke | ............... | G01N 30/6047 |
| | | | | 248/512 |
| 9,956,684 B2* | 5/2018 | Welfel | ..................... | B25H 3/06 |
| 10,507,072 B1* | 12/2019 | MisIe | ...................... | A61B 50/22 |
| 2007/0039231 A1* | 2/2007 | Jenkins | ................. | A01K 97/08 |
| | | | | 43/26 |
| 2007/0039911 A1* | 2/2007 | Sator | ...................... | A63D 15/10 |
| | | | | 211/68 |
| 2007/0278166 A1* | 12/2007 | Morton | .................. | A01K 97/08 |
| | | | | 211/70.8 |
| 2014/0125075 A1* | 5/2014 | Xiques | .................. | A01K 97/08 |
| | | | | 294/143 |
| 2015/0201601 A1* | 7/2015 | Honermann | ........... | A01K 97/22 |
| | | | | 211/70.8 |

* cited by examiner

PORTABLE COMBINED FISHING ROD HOLDER AND STORAGE STAND

BACKGROUND OF THE INVENTION

1. Field of the Invention

This invention relates, generally, to fishing rod holders. More specifically, it relates to a combined fishing rod holder and storage stand that is portable, such that the device can be used to transport fishing rods from a storage location to a fishing location, and such that the device can be used to hold fishing rods during both storage and usage.

2. Brief Description of the Prior Art

Traditional fishing rod holders include permanent fixtures on fishing docks, fishing boats, trucks, and home storage device, as well as temporary pole holders that can be inserted into a ground surface, such as soil or sand surfaces. The holders are simplistic in design, typically include a hollow cylinder with two open ends, and at times including a slot to receive the reel of a fishing rod. In use, a user inserts one end of the fishing rod (preferably the handle end) into the rod holder, allowing the fishing rod to rest within the rod holder during the activity of fishing. As such, the user does not need to actively hold the rod while fishing, but can still notice if a fish interacts with the hook in the water.

A drawback of traditional fishing rod holders is that they are limited to use during fishing, since they require installation, either permanent or temporary, on a dock, boat, or a beach. As such, a user is limited in the positioning of the fishing rod depending on the installation location of the rod holder. Moreover, such traditional rod holders cannot be easily used for transporting the fishing rod therein, particularly due to their simplistic designs. For example, a user could not easily use a traditional fishing rod holder to store a fishing rod during transportation from a storage location to a vehicle, or from a vehicle to a fishing location, because the simplistic cylindrical design does not provide a way to secure the fishing rod to prevent damage thereto.

In addition, traditional fishing rod holders used during storage are typically bulky and cumbersome fixtures, designed as non-portable furniture as opposed to portable holders. For example, racks exist that are designed to receive one or more fishing rods for storage while not in use, such as in a storage unit or garage. However, such storage racks are not portable and, as such, are not designed to be transported from a garage to a fishing location. Moreover, such storage racks typically lack the capability to be efficiently used during fishing, such as by lacking the cylindrical formation of traditional fishing rod holders.

Accordingly, what is needed is a combined portable fishing rod holder and storage stand. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a combined portable fishing rod holder and storage stand is now met by a new, useful, and nonobvious invention.

The novel structure includes a base including a top surface opposite a bottom surface, with a body disposed between the top surface and the bottom surface. The body is defined by a height of the base between the top surface and the bottom surface. In an embodiment, a continuous circumferential side wall joins the top surface of the base with the bottom surface of the base, and the base includes a diameter of less than approximately twelve inches, such that the base is configured to be received within a standard five-gallon bucket. In an embodiment, a plurality of anchoring apertures are formed within the body from the top surface through the bottom surface. The plurality of anchoring apertures are configured to receive an earth-anchoring mechanism therethrough to secure the base to a ground surface.

At least one holder receipt is disposed within the body of the base. The holder receipt is defined by at least one inner wall formed within the body of the base. The inner wall extends from the top surface in a direction toward the bottom surface, and in an embodiment extends through the bottom surface, creating a through-bore. In an embodiment, at least one projection extends perpendicularly in a direction away from the top surface at the least one holder receipt. The projection has a diameter equal to the diameter of the at least one holder receipt, and the projection is continuous with the inner wall. As such, the projection is configured to guide the at least one holder unit into the at least one holder receipt.

At least one holder unit is removably secured to the base via the at least one holder receipt. The holder unit includes a top end opposite a bottom end. The bottom end has a diameter that is smaller than a diameter of the at least one holder receipt, such that the at least one holder receipt is configured to receive the at least one holder unit therein. In an embodiment, the diameter of each of the plurality of holder receipts is equal, and the diameter of the bottom end of each of the plurality of holder units is equal. The inner wall includes a plurality of ridges, and an outer surface of the holder unit proximate to the bottom end thereof includes a plurality of ridges. The ridges are complementary to each other, such that a screw-threaded relationship exists between the holder unit and the holder receipt.

In an embodiment, a slot is formed within a body of the holder unit. The slot is disposed proximate to the top surface and extends longitudinally toward the bottom surface of the holder unit. As such, the slot is configured to receive a reel of the fishing rod storable within the combined fishing rod holder and storage stand.

In an embodiment, a projection extends perpendicularly in a direction away from each holder unit. The projection includes a plurality of walls that, together with a body of each of the plurality of holder units, defines an opening therebetween. The opening is configured to receive a cable tie, elastic rope, length of material, or other securing device therethrough to bundle rod together securely, such that adjacent holder units of the plurality of holder units are configured to be secured together via adjacent projections.

When secured together, the base and the at least one holder unit are configured to receive a fishing rod through the at least one holder unit. The fishing rod is thereby transportable and storable in the combined fishing rod holder and storage stand when received by the at least one holder unit.

An object of the invention is to improve the transportation and storage, both during use and during storage, of fishing rods by providing a singular combined platform that can be used to transport and anchor fishing rods.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a combined portable fishing rod holder and storage stand including a base and a plurality of holder units. The base includes a plurality of anchoring apertures configured to receive anchoring mechanisms therethrough, such as stakes, pins, and other earth anchors that can secure within a ground surface. As such, the base of the combined apparatus is securable to a ground surface. In addition, the base includes a plurality of holder receipts that are configured to receive and retain the plurality of holder units. Each holder unit is designed to receive and retain an object, such as an assembled or disassembled fishing rod therein, and the plurality of holder units are designed to secure to each other. As such, one or more fishing rods can be secured within the combined apparatus during storage, transportation, and use during fishing activities, without the need to use multiple products for each application. The combined apparatus is described in greater detail in the sections herein below.

Figure 1:
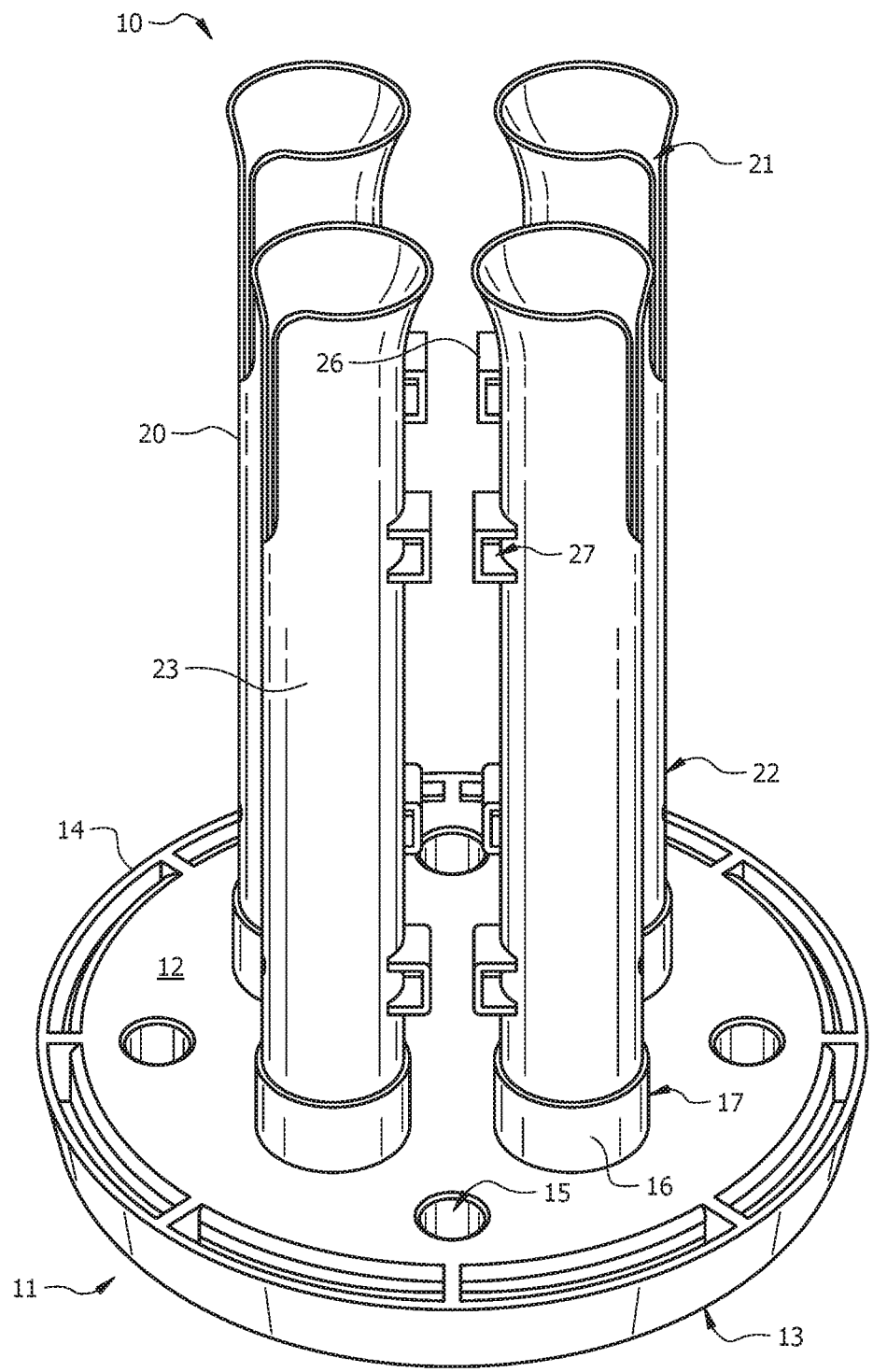
FIG. 1 is a perspective view of a combined portable fishing rod holder and storage stand, in accordance with an embodiment of the present invention.
Figure 2:
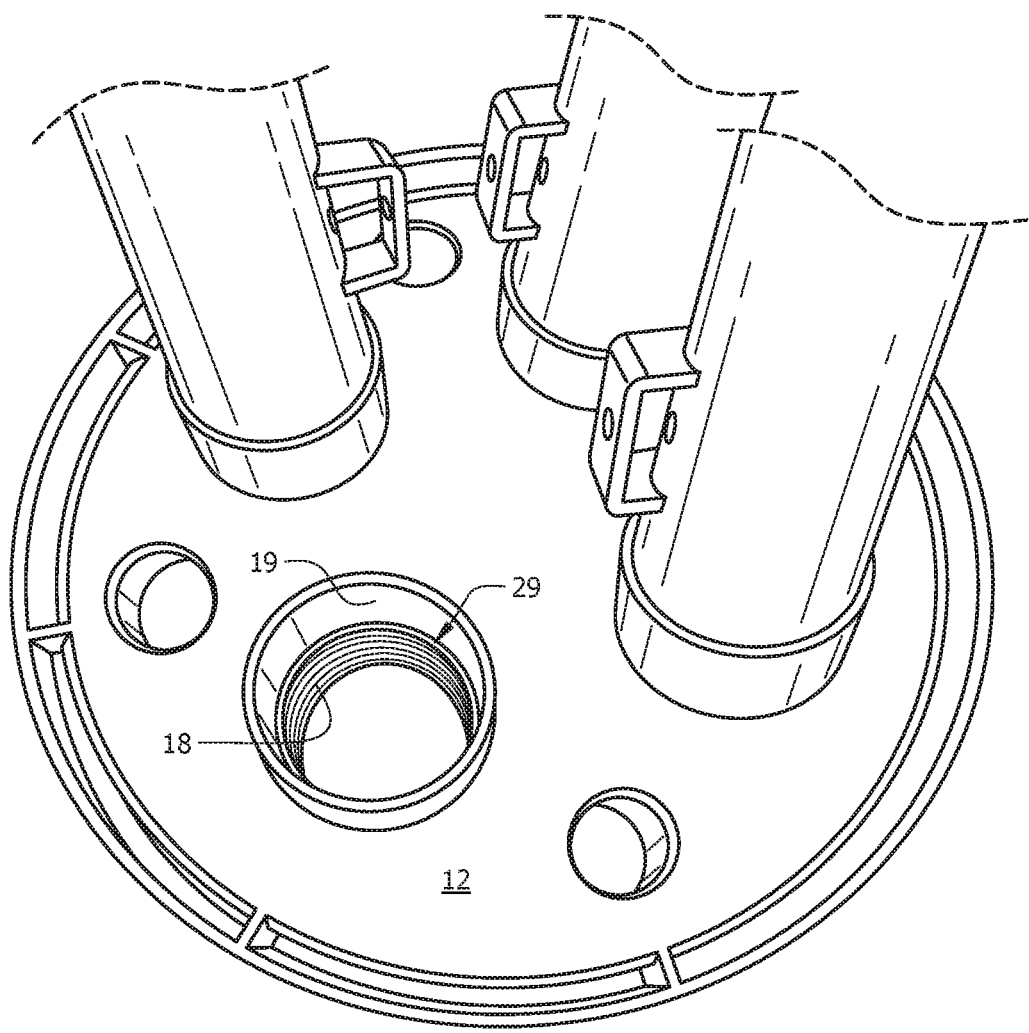
FIG. 2 is a perspective view of the combined portable fishing rod holder and storage stand of FIG. 1, showing in particular one of the holder receipts formed within the base of the combined apparatus.
Figure 3:
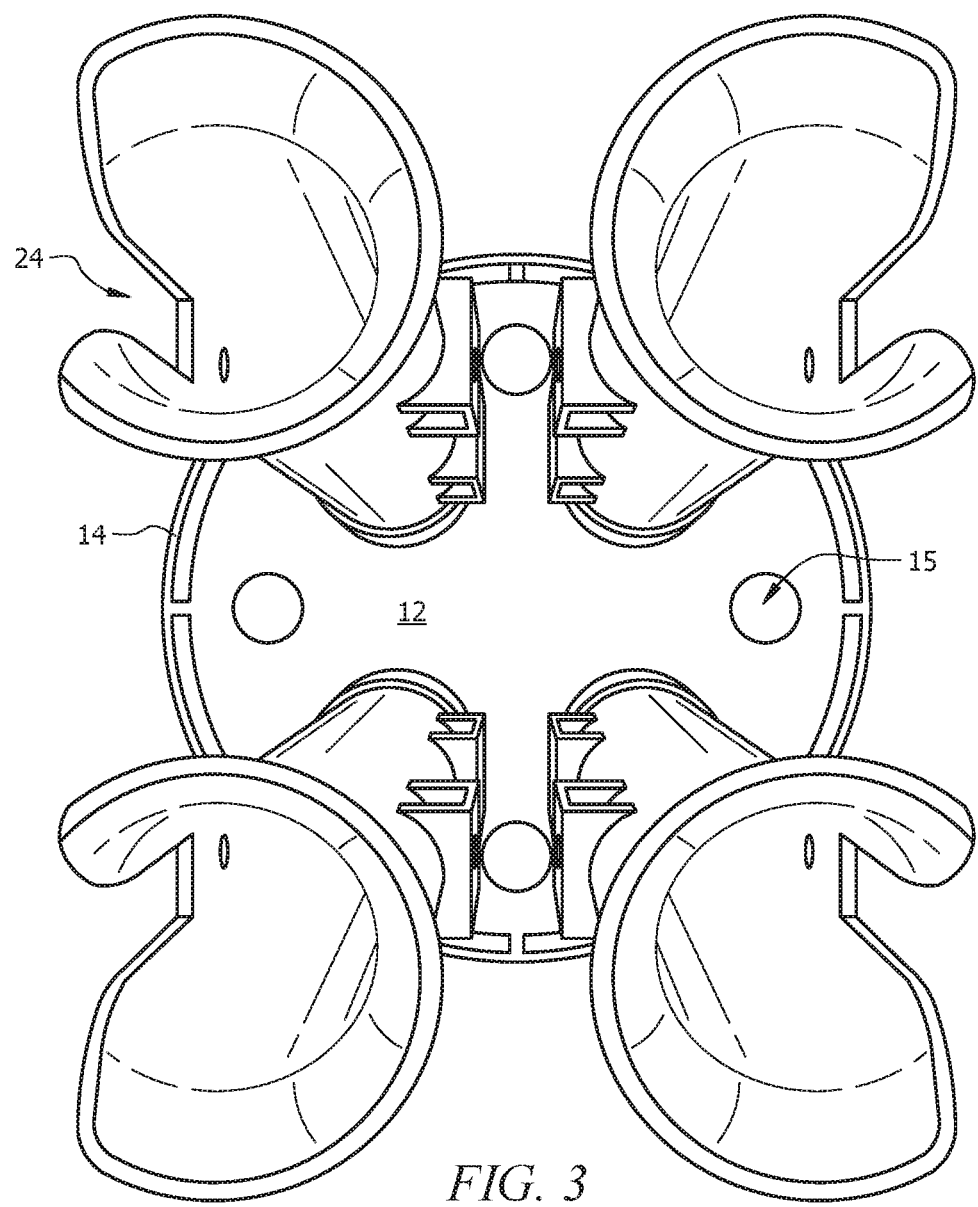
FIG. 3 is a top-down view of the combined portable fishing rod holder and storage stand of FIG. 1.

As shown in FIGS. 1-3, combined portable fishing rod holder and storage stand 10 (also referred to as combined apparatus 10) includes base 11. Base 11 includes a body defined by top surface 12, bottom surface 13 opposite top surface 12, and side wall 14 joining top surface 12 to bottom surface 13. Side wall 14 defines a height of base 11 from bottom surface 13 to top surface 12. In an embodiment, as shown in FIG. 1, side wall 14 is a circumferential side wall as the body of base 11 is approximately circular in shape. In such an embodiment, a diameter of base 11 is preferentially smaller than a diameter of a standard five-gallon bucket, which is approximately 12" in diameter. As such, in an embodiment, combined apparatus 10 is storable within a standard five-gallon bucket. It should be appreciated that other embodiments of base 11 may differ in shape and dimensions.

Base 11 also includes one or more anchoring apertures 15 disposed therein. Each anchoring aperture 15 extends through the body of base 11 from top surface 12 through bottom surface 13, forming a through-bore disposed within the body of base 11. The anchoring apertures 15 are designed to receive anchoring mechanisms therethrough to secure combined apparatus 10 to a ground surface, particularly an earth surface. For example, in an embodiment, combined apparatus 10 is used as a fishing rod holder during fishing activities (as will be discussed in greater detail below). In the event that the fishing activities occur on a beach including sand and/or grass, stakes can be employed as anchoring mechanisms to be inserted through one or more of anchoring apertures 15. As such, combined apparatus 10 is secured during fishing activities via an anchoring mechanism inserted through anchoring apertures 15.

In addition, base 11 includes one or more holder receipts 17 disposed within the body of base 11. Each holder receipt 17 is defined within top surface 12 of base 11, and each holder receipt 17 is defined at least partially within the body of base 11, such that the receipt extends into the body of base 11 toward bottom surface 13. In addition, each holder receipt 17 is defined by at least one inner wall 19 formed within the body of base 11 between top surface 12 and bottom surface 13. As shown in FIG. 2, in an embodiment, holder receipt 17 is defined through the entirety of the body of base 11 from top surface 12 through bottom surface 13. As such, inner wall 19 has a height approximately equal to that of side wall 14. In addition, as shown in FIG. 2, in an embodiment, inner wall 19 is a continuous and circumferential wall defining an approximately circular holder receipt 17.

In an embodiment as shown in FIG. 2, inner wall 19 includes a first diameter proximate to top surface 12 of base 11, and a second diameter proximate to bottom surface 13 of base 11. The second diameter is smaller than the first diameter and is formed by lip 29 disposed within holder receipt 17 between top surface 12 and bottom surface 13 of base 11. Lip 29 projects radially from inner wall 19 toward a central point thereof, and lip 29 is circumferentially continuous about the surface of inner wall 19. As such, lip 29 forms a top surface of a second portion of inner wall 19, the second portion being smaller in diameter than a first portion that resides in the space above lip 29, proximate to top surface 12. The second portion of inner wall 19 includes a plurality of ridges 18 disposed thereon that are designed to screw-threadedly attach to a complementary plurality of ridges on a holder unit, as described in greater detail below. It should be appreciated that an embodiment of holder receipt 17 does not include lip 29, but rather only includes the plurality of ridges 18. As shown in FIG. 2, in an embodiment, one or more projections 16 extend perpendicularly from top surface 12 of base 11 in a direction away from bottom surface 13 of base 11, such that each projection 16 defines the first portion of holder receipt 17. Projections 16 aid in the receipt of a holder unit, described below.

As noted above, FIGS. 1-3 also depict a plurality of holder units 20 removably secured to base 11 of combined portable fishing rod holder and storage stand 10. An individual one of the plurality of holder units 20 is shown in greater detail in FIGS. 4A-7 in a detached configuration with respect to base 11. Each holder unit 20 includes a top end 21 opposite a bottom end 22, with body 23 extending therebetween to join top end 21 to bottom end 22. Body 23 includes at least one outer surface opposite at least one inner surface; for example, as shown in FIGS. 4A-7, body 23 includes a singular continuous outer surface and a singular continuous inner surface, as body 23 is substantially cylindrical in shape. In addition, body 23 is open on each of the top and bottom ends 21, 22 of holder unit 20, such that the inner surface of body 23 at top end 21 defines an opening and the inner surface of body 23 at bottom end 22 defines an opposing opening. The inner surface of body 23 disposed between top end 21 and bottom end 22 defines a cavity therein between the opposing openings. As such, an embodiment of holder unit 20 includes a cylindrical body 23 include opposing open ends at top end 21 and bottom end 22, such that body 23 can receive an object through each of the openings defined by top end 21 and bottom end 22.

Figure 4A:
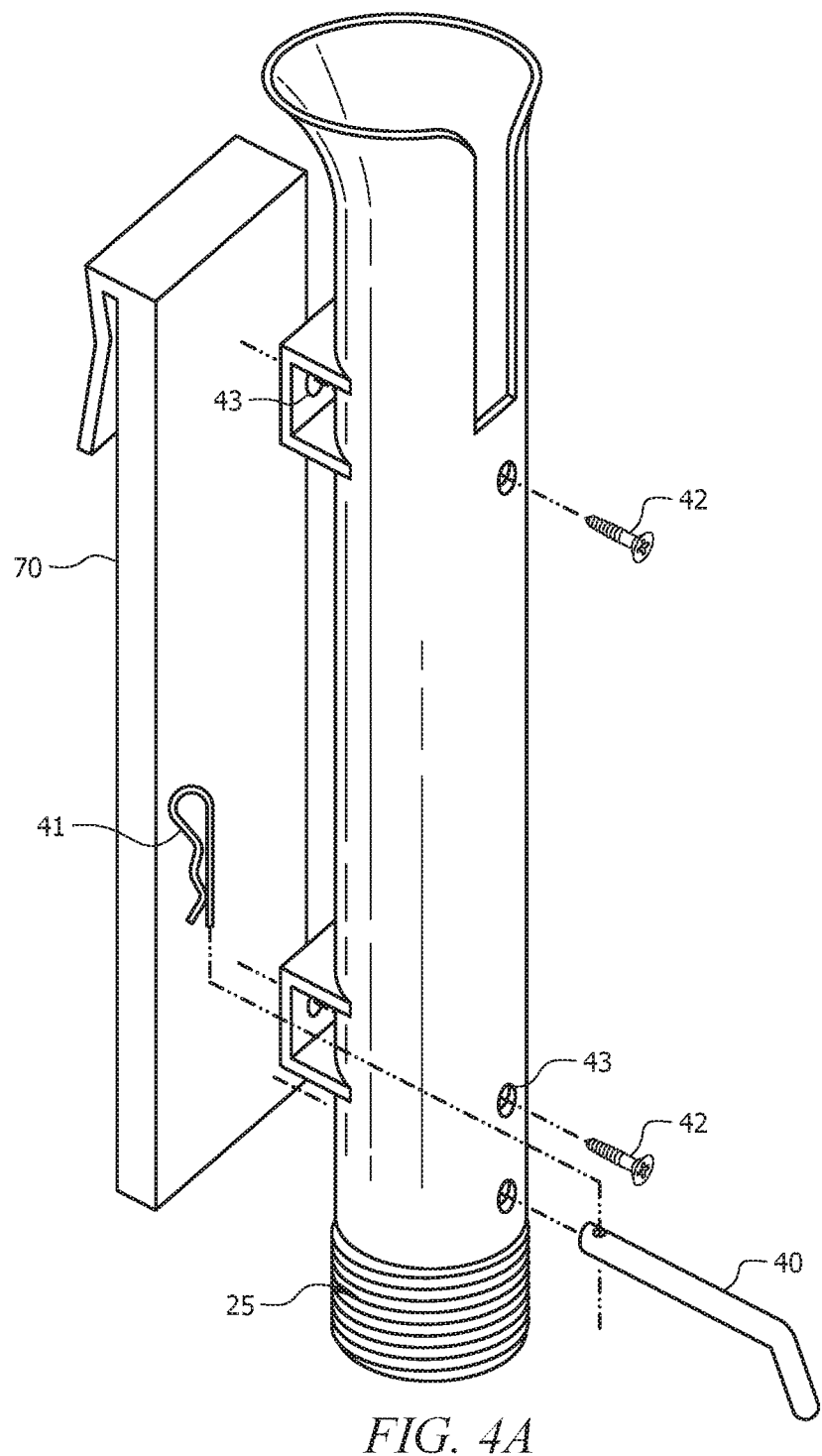
FIG. 4A is a perspective view of one of the holder units of FIG. 1, in particular showing an attachment of the holder unit to an external docking component.

Each of top end 21 and bottom end 22 define a length disposed between opposing inner surfaces, thereby defining a volume through which an object can be received within holder unit 20. For example, as shown in the embodiment of FIG. 4A in particular, the inner surface of top end 21 defines a diameter that is great than a diameter defined by the inner surface of bottom end 22. As such, an object having an effective diameter or width greater than the diameter of bottom end 22, but less than the diameter of top end 21, is receivable through top end 21 without passing through bottom end 22, thereby being retained within body 23 between top end 21 and bottom end 22. In addition, as particularly shown in FIG. 5, slot 24 is defined within body 23 proximate to top end 21, with slot 24 extending in a direction toward bottom end 22 along a longitudinal extent of body 23. Slot 24 is designed to receive an object therein to retain the object, preventing the object from passing through the entirety of body 23.

Figure 4B:
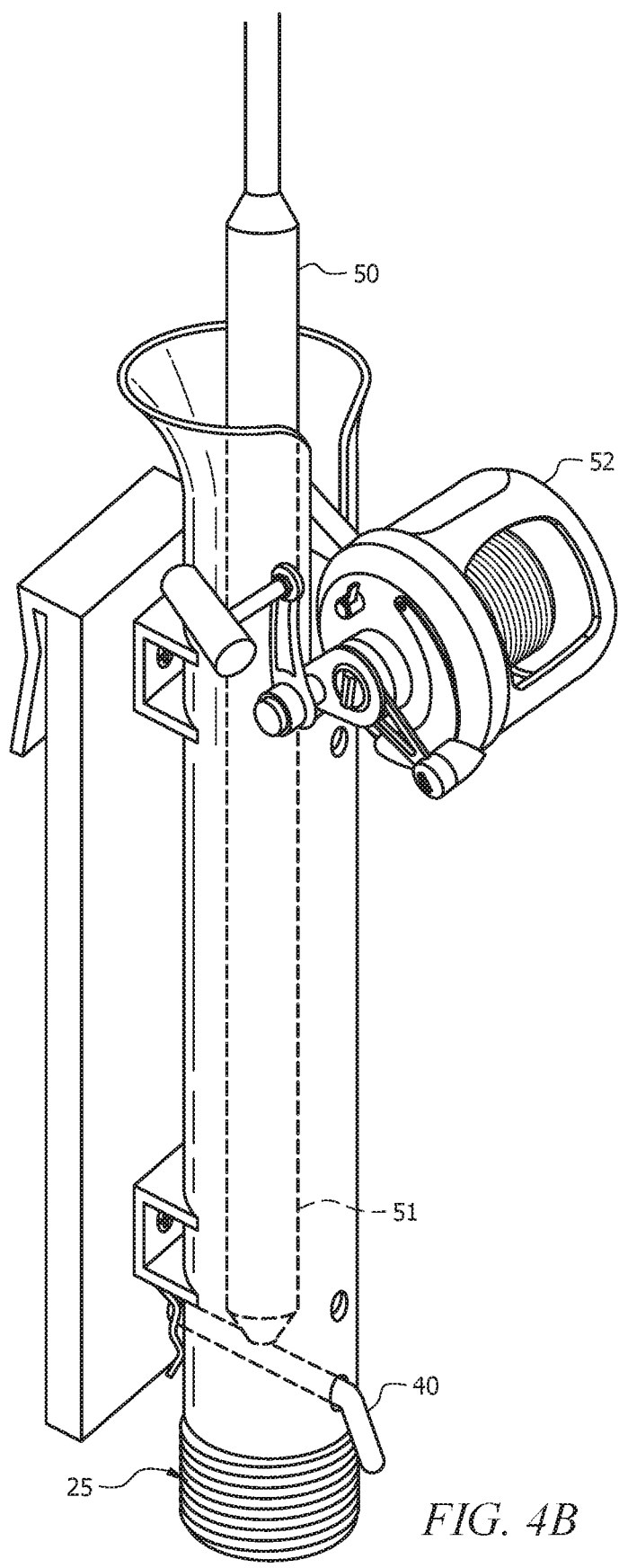
FIG. 4B is a perspective view of one of the holder units of FIG. 1, in particular showing a fishing rod received within the holder unit.
Figure 5:
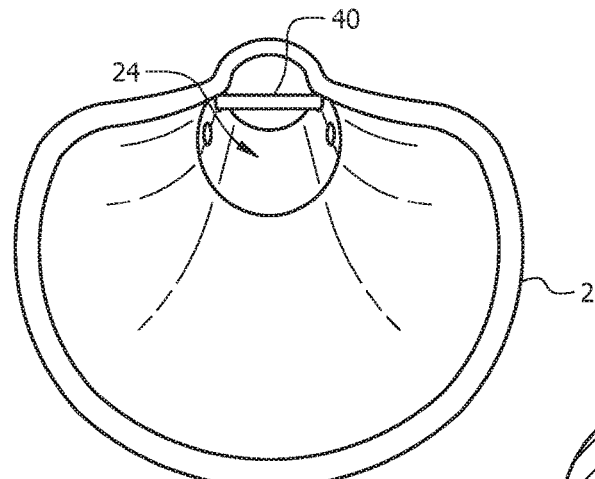
FIG. 5 is an orthogonal view of one of the holder units of FIGS. 4A-4B, showing the internal cavity and slot of the holder unit from a top-down perspective.
Figure 6:
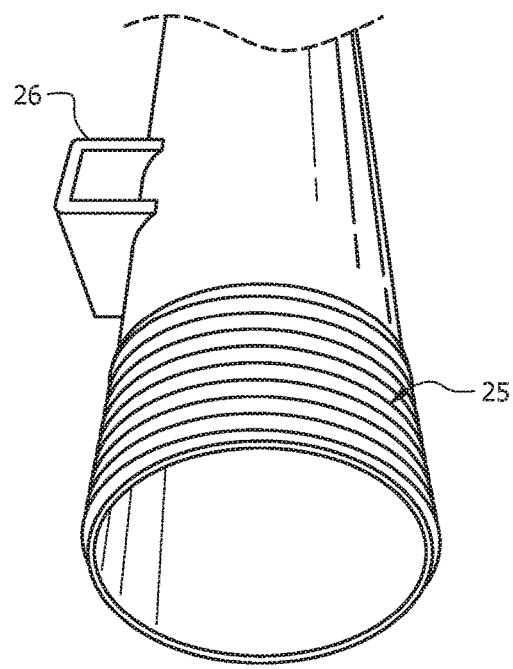
FIG. 6 is a perspective view of the holder unit of FIGS. 4A-4B, showing a bottom portion of the holder unit including one half of the attachment mechanism between the holder unit and the base of the combined portable fishing rod holder and storage stand, in accordance with an embodiment of the present invention.
Figure 7:
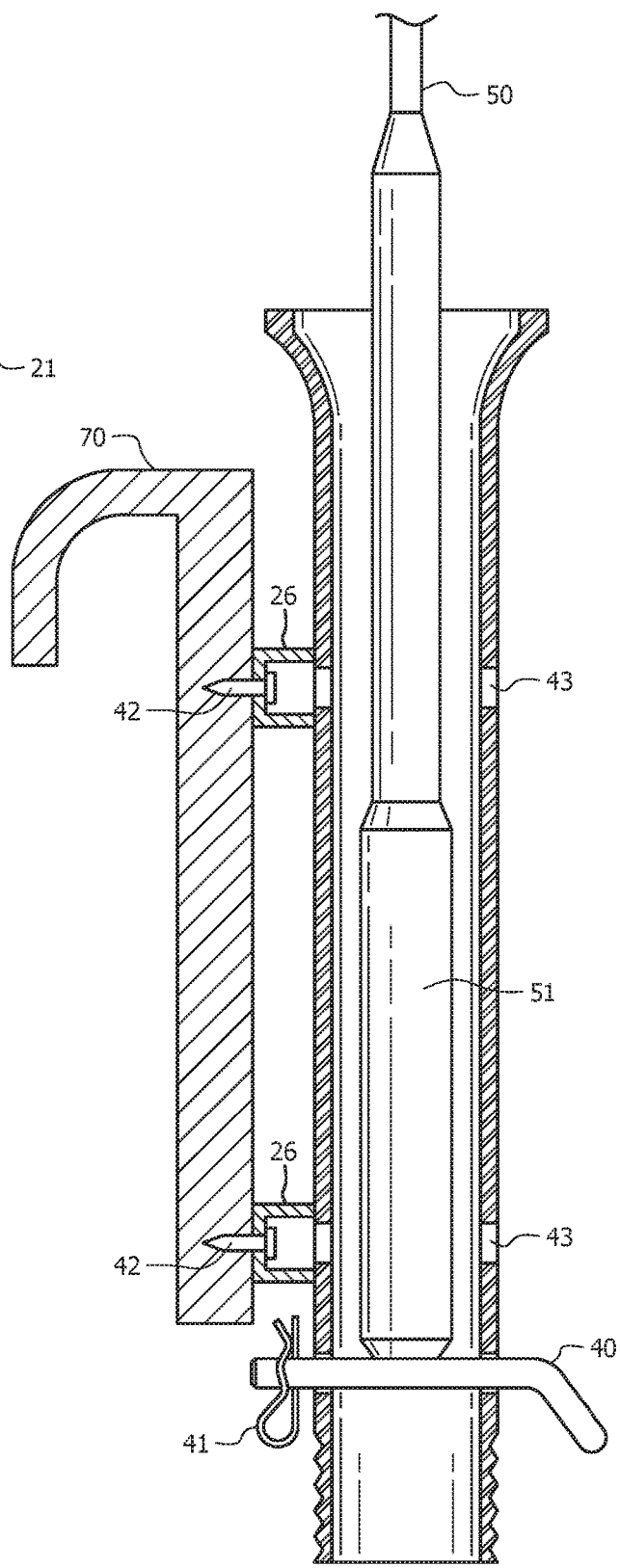
FIG. 7 shows a cross-sectional view of the holder unit of FIGS. 4A-4B, showing the attachment of the holder unit to an external docking component, as well as a retention pin inserted within the internal cavity of the holder unit configured to prevent a fishing rod from passing through the unit.

In a specific example, as discussed herein and shown in FIGS. 4B and 7, fishing rod 50 is received within body 23, with reel 52 of fishing rod 50 (which projects laterally away from the longitudinal extent of the fishing rod) being received within slot 24. As such, fishing rod 50 is received within body 23 via top end 21, with handle portion 51 of the rod disposed proximate to bottom end 22, such that reel 52 of the fishing rod is received within slot 24 to prevent further longitudinal translation of the rod toward bottom end 22. In addition, in an embodiment, holder unit 20 includes a plurality of aligned apertures disposed proximate to bottom end 22 thereof, as shown in particular in FIGS. 4A-4B and 7. The apertures are disposed to receive retention pin 40 therethrough, which is itself received on an opposing exterior surface of holder unit 20 by clasp 41. Retention pin 40 spans a diameter of holder unit 20, forming a barrier to prevent the longitudinal translation of an object (such as fishing rod 50) through bottom end 22.

As discussed above, each holder unit 20 secures to base 11. As such, the diameter of bottom end 22 of holder unit 20 is slightly smaller than the diameter of holder receipt 17, such that holder unit 20 is receivable within holder receipt 17 while forming a secure connection. Moreover, to secure each holder unit 20 to base 11, each holder unit 20 includes an attachment mechanism disposed at bottom end 22 of body 23. As particularly shown in FIG. 6, an embodiment of body 23 includes a plurality of ridges 25 disposed at bottom end 22 thereof. The plurality of ridges 25 are complementary to the plurality of ridges 18 of base 11. Accordingly, each holder unit 20 is securable to base 11 via at least one of holder receipts 17 via the coupling of ridges 25 of holder unit 20 and ridges 18 of base 11, such as via a screw-threading relationship. It should be appreciated that other attachment mechanisms are contemplated between holder unit 20 and base 11, such as a press fit, a pin-and-aperture mechanism, a latch, and other similar attachment and detachment mechanisms.

As shown in particular in FIG. 4A-4B and FIG. 7, each holder unit 20 includes at least one projection 26 extending laterally from at least one outer surface of body 23 in a direction away from the inner surface of body 23. For example, an embodiment of holder unit 20 includes a set of projections 26 that are substantially aligned on the outer surface of body 23 and that are approximately equal in size and shape. Each projection 26 includes a set of walls that define opening 27 therebetween, such that opening 27 is defined by the walls of projection 26 and the outer surface of body 23. In an embodiment, holder unit 20 includes a set of apertures 43 aligned within a projection 26 and an opposing body surface of holder unit 20, such that screw 42 can be inserted through apertures 43 to secure holder unit 20 to anchor point 70, such as a surface of a fishing dock.

Figure 8:
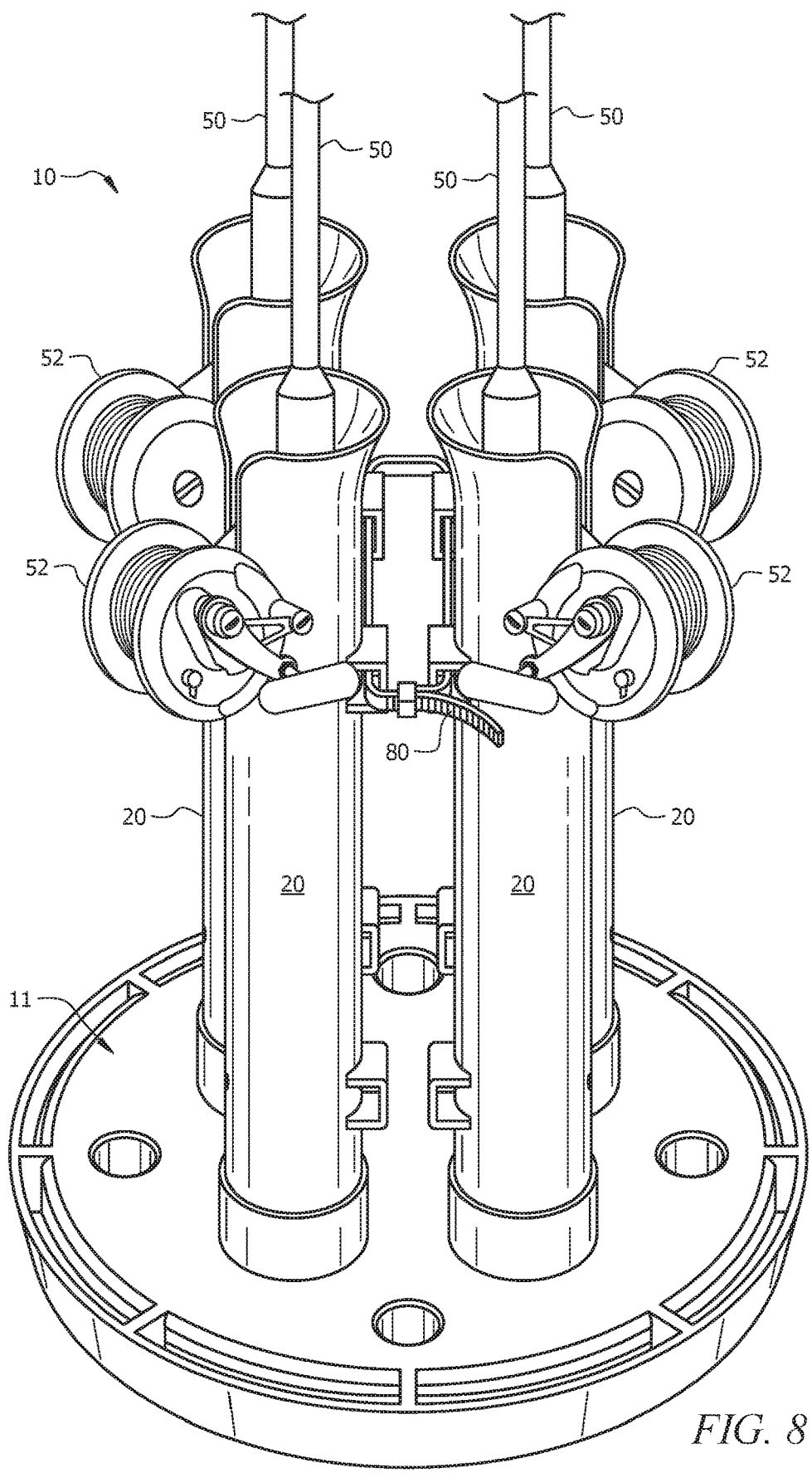
FIG. 8 shows a perspective view of the combined portable fishing rod holder and storage stand of FIG. 1, showing a plurality of fishing rods received within the holder, in accordance with an embodiment of the present invention.

Opening 27 is designed to receive a coupling mechanism therethrough, such as a length of a material used to secure objects together. The length of material can be a length of rope, vinyl, nylon, cloth, or polymeric material, and in a preferred embodiment is a cable tie made of one or more materials. For example, as shown in FIG. 8, one or more cable ties 80 or other coupling mechanism can be inserted through openings 27 on adjacent holder units 20 to secure the adjacent holder units 20 together. As such, a further securing mechanism accomplished via projections 26 and opening 27 enhances the connection between holder units 20, further securing any objects, such as fishing rods, stored within combined portable fishing rod holder and storage stand 10. In addition, one or more cable ties 80 can be used to secure adjacent fishing rods 50 together, such as by wrapping around reels 52 of rods 50 to secure the rods in place, thereby preventing movement of the rods.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A combined fishing rod holder and storage stand comprising:
    a base including a top surface opposite a bottom surface, with a body disposed between the top surface and the bottom surface, the body defined by a height of the base between the top surface and the bottom surface;
    at least two holder receipts disposed within the body of the base, each of the at least two holder receipts defined by at least one inner wall formed within the body of the base, the at least one inner wall extending from the top surface in a direction toward the bottom surface;
    at least two holder units each removably secured to the base via each of the at least two holder receipts, each of the at least two holder units including a top end opposite a bottom end, the bottom end having a diameter smaller than a diameter of the at least one holder receipt, such that each of the at least two holder receipts is configured to receive one of the at least two holder units therein; and
    a molded channel extending perpendicularly in a direction away from each of the at least two holder units, each molded channel secured to one of the at least two holder units and forming a closed channel therethrough between an interior surface of the molded channel and the holder unit,
    wherein each closed channel is configured to receive a cable tie therethrough, such that adjacent holder units of the at least two holder units are configured to be secured together via adjacent molded channels, and
    wherein, when secured together, the base and each of the at least two holder units are configured to receive a fishing rod through each of the at least two holder units, such that the fishing rods are transportable and storable in the combined fishing rod holder and storage stand when received by the at least two holder units.

2. The combined fishing rod holder and storage stand of claim 1, further comprising a continuous circumferential side wall joining the top surface of the base with the bottom surface of the base.

3. The combined fishing rod holder and storage stand of claim 2, wherein the base includes a diameter of less than approximately twelve inches, such that the base is configured to be received within a standard five-gallon bucket.

4. The combined fishing rod holder and storage stand of claim 1, further comprising a plurality of anchoring apertures formed within the body from the top surface through the bottom surface, each of the plurality of anchoring apertures configured to receive an earth-anchoring mechanism therethrough to secure the base to a ground surface.

5. The combined fishing rod holder and storage stand of claim 1, further comprising a projection extending perpendicularly in a direction away from the top surface of each of the at the least two holder receipts, the projection having a diameter equal to the diameter of each of the at least two holder receipts, such that each projection is configured to guide each of the at least two holder units into one of the at least two holder receipts.

6. The combined fishing rod holder and storage stand of claim 1, wherein the at least one inner wall defining each of the at least two holder receipts further comprises a plurality of ridges.

7. The combined fishing rod holder and storage stand of claim 6, wherein an outer surface disposed proximate to the bottom end of each of the at least two holder units further comprises a plurality of ridges complementary to the plurality of ridges of the at least one inner wall of each of the at least two holder receipts, such that a screw-threaded relationship exists between each of the at least two holder units and each of the at least two holder receipts.

8. The combined fishing rod holder and storage stand of claim 1, further comprising a slot formed within a body of each of the at least two holder units, the slot disposed proximate to the top surface and extending longitudinally toward the bottom surface of each of the at least two holder units, such that each slot is configured to receive a reel of each fishing rod storable within the combined fishing rod holder and storage stand.

9. A combined fishing rod holder and storage stand system comprising:
    a base including a top surface opposite a bottom surface, with a body disposed between the top surface and the bottom surface, the body defined by a height of the base between the top surface and the bottom surface;
    a plurality of anchoring apertures formed within the body from the top surface through the bottom surface, each of the plurality of anchoring apertures configured to receive an earth-anchoring mechanism therethrough to secure the base to a ground surface;
    a plurality of holder receipts disposed within the body of the base, each of the plurality of holder receipts defined by a continuous circumferential inner wall formed within the body of the base, the inner wall extending from the top surface through the bottom surface, forming a through-bore;
    a plurality of holder units, each of the plurality of holder units removably secured to the base via one of the plurality of holder receipts, each of the plurality of holder units including a top end opposite a bottom end, the bottom end having a diameter smaller than a diameter of each of the plurality of holder receipts, such that each of the plurality of holder receipts is configured to receive one of the plurality of holder units therein; and a molded channel extending perpendicularly in a direction away from each of the plurality of holder units, each molded channel secured to one of the plurality of holder units and forming a closed channel therethrough between an interior surface of the molded channel and the holder unit, wherein each closed channel is configured to receive a cable tie therethrough, such that adjacent holder units of the plurality of holder units are configured to be secured together via adjacent molded channels, and wherein, when secured together, the base and the plurality of holder units are configured to receive a fishing rod through each of the plurality of holder units, such that the fishing rods are transportable and storable in the combined fishing rod holder and storage stand when received by the plurality of holder units.

10. The combined fishing rod holder and storage stand system of claim 9, wherein the diameter of each of the plurality of holder receipts is equal, and wherein the diameter of the bottom end of each of the plurality of holder units is equal.

11. The combined fishing rod holder and storage stand system of claim 9, further comprising a continuous circumferential side wall joining the top surface of the base with the bottom surface of the base.

12. The combined fishing rod holder and storage stand system of claim 11, wherein the base includes a diameter of less than approximately twelve inches, such that the base is configured to be received within a standard five-gallon bucket.

13. The combined fishing rod holder and storage stand system of claim 9, further comprising a plurality of projections extending perpendicularly in a direction away from the top surface of the base, such that each of the plurality of projections is continuous with the circumferential inner wall of each of the plurality of holder receipts, and such that each of the plurality of projections is configured to guide one of the plurality of holder units into one of the plurality of holder receipts.

14. The combined fishing rod holder and storage stand system of claim 9, wherein each of the circumferential inner walls of the base further comprises a plurality of ridges.

15. The combined fishing rod holder and storage stand system of claim 14, wherein an outer surface disposed proximate to the bottom end of each of the plurality of holder units further comprises a plurality of ridges complementary to the plurality of ridges of each of the circumferential inner walls of the base, such that a screw-threaded relationship exists between each of the plurality of holder units and each of the plurality of holder receipts.

16. The combined fishing rod holder and storage stand system of claim 9, further comprising a slot formed within a body of each of the plurality of holder units, the slot disposed proximate to the top surface and extending longitudinally toward the bottom surface, such that the slot is configured to receive a reel of the fishing rod storable within the combined fishing rod holder and storage stand system.

17. A portable fishing rod retention, transportation, and storage apparatus comprising:

a base including a top surface opposite a bottom surface, with a continuous circumferential side wall joining the top surface of the base, such that the top surface, the bottom surface, and the continuous circumferential side wall together define a body of the base;

a plurality of holder receipts disposed within the body of the base, each of the plurality of holder receipts defined by a continuous circumferential inner wall formed within the body of the base, the inner wall extending from the top surface through the bottom surface, forming a through-bore, each inner wall including a plurality of ridges;

a plurality of holder units, each of the plurality of holder units removably secured to the base via one of the plurality of holder receipts, each of the plurality of holder units including a top end opposite a bottom end, the bottom end having a diameter smaller than a diameter of each of the plurality of holder receipts, such that each of the plurality of holder receipts is configured to receive one of the plurality of holder units therein, and an outer surface of each of the plurality of holder units including a plurality of ridges disposed at the bottom end thereof, the plurality of ridges complementary to the plurality of ridges of each of the plurality of holder receipts, such that a screw-threaded relationship exists between each of the plurality of holder units and each of the plurality of holder receipts; and a molded channel extending perpendicularly in a direction away from each of the plurality of holder units, each molded channel secured to one of the plurality of holder units and forming a closed channel therethrough between an interior surface of the molded channel and the holder unit, wherein each closed channel is configured to receive a cable tie therethrough, such that adjacent holder units of the plurality of holder units are configured to be secured together via adjacent molded channels, and wherein, when secured together, the base and the plurality of holder units are configured to receive a fishing rod through each of the plurality of holder units, such that the fishing rods are transportable and storable in the portable fishing rod retention, transportation, and storage apparatus when received by the plurality of holder units.

18. The portable fishing rod retention, transportation, and storage apparatus of claim 17, further comprising a plurality of anchoring apertures formed within the body from the top surface through the bottom surface, each of the plurality of anchoring apertures configured to receive an earth-anchoring mechanism therethrough to secure the base to a ground surface.

* * * * *